United States Patent
Schindler et al.

(10) Patent No.: US 7,091,298 B2
(45) Date of Patent: Aug. 15, 2006

(54) ALCOXY CROSS-LINKING, SINGLE-COMPONENT, MOISTURE-HARDENING MATERIALS

(75) Inventors: Wolfram Schindler, Tüssling (DE); Andreas Bauer, Kirchdorf (DE); Volker Stanjek, München (DE); Bernd Pachaly, Mehring (DE)

(73) Assignee: Consortium fuer Elektrochemische Industrie GmbH, Munich (DE)

( * ) Notice: Subject to any disclaimer, the term of this patent is extended or adjusted under 35 U.S.C. 154(b) by 57 days.

(21) Appl. No.: 10/484,300

(22) PCT Filed: Jul. 18, 2002

(86) PCT No.: PCT/EP02/08019

§ 371 (c)(1),
(2), (4) Date: Jan. 20, 2004

(87) PCT Pub. No.: WO03/014226

PCT Pub. Date: Feb. 20, 2003

(65) Prior Publication Data

US 2004/0181025 A1  Sep. 16, 2004

(30) Foreign Application Priority Data

Aug. 9, 2001 (DE) ................................ 101 39 132

(51) Int. Cl.
*C08G 77/04* (2006.01)
(52) U.S. Cl. .................... 528/34; 525/474; 525/342
(58) Field of Classification Search .................. 528/34; 525/474, 342
See application file for complete search history.

(56) References Cited

U.S. PATENT DOCUMENTS

| | | | |
|---|---|---|---|
| 3,494,951 A | 2/1970 | Berger | |
| 3,632,557 A * | 1/1972 | Brode | 528/28 |
| 3,971,751 A | 7/1976 | Isayama et al. | |
| 5,254,657 A | 10/1993 | Inoue | |
| 5,990,257 A | 11/1999 | Johnston et al. | |
| 6,124,387 A | 9/2000 | Wang et al. | |
| 6,204,403 B1 * | 3/2001 | Pepe et al. | 556/419 |
| 6,310,170 B1 * | 10/2001 | Johnston et al. | 528/38 |
| 6,626,988 B1 * | 9/2003 | Schmalstieg et al. | 106/287.25 |

FOREIGN PATENT DOCUMENTS

| | | |
|---|---|---|
| DE | 198 49 817 A1 | 5/2000 |
| DE | 199 23 300 A1 | 11/2000 |
| EP | 0 070 475 A2 | 1/1983 |
| EP | 1 104 787 | * 6/2001 |
| WO | 00/71595 | * 11/2000 |

OTHER PUBLICATIONS

Derwent Abstract corresponding to DE 199 23 300 AN [2001-081580].
Derwent Abstract corresponding to DE 19849817 AN [2000-351610].

* cited by examiner

*Primary Examiner*—Kuo-Liang Peng
(74) *Attorney, Agent, or Firm*—Brooks Kushman P.C.

(57) ABSTRACT

Alkoxy-crosslinking one-component moisture curing compositions contain a polymer bearing (alkoxy)(methyl)silylalkyl-terminal groups, and specific silanes as described herein. The compositions exhibit improved shelf life and yet retain other desirable characteristics.

16 Claims, No Drawings

ALCOXY CROSS-LINKING, SINGLE-COMPONENT, MOISTURE-HARDENING MATERIALS

CROSS-REFERENCE TO RELATED APPLICATION

This application claims priority to PCT Appln. No. PCT/US02/08019 filed Jul. 18, 2002, and to German application 101 39 132.3 filed Sep. 8, 2001.

BACKGROUND OF THE INVENTION

1. Field of the Invention

The invention relates to alkoxy-crosslinking one-component sealant materials based on alkoxyorganosilane-terminated polymers having an outstanding shelf-life and outstanding curing characteristics.

2. Description of the Related Art

Organic polymers having terminal silane groups in the form of one-component materials curing with atmospheric humidity (RTV-1) are known and are widely used for the preparation of flexible sealants and adhesives. Such polymers may be composed of different building blocks. Usually, these are polyurethanes, polyethers, polyesters, polyacrylates, polyvinyl esters, ethylene/olefin copolymers, styrene/butadiene copolymers or polyolefins. It is known that, for stabilization during the processing and storage of the compounds, low molecular weight compounds which have hydrolyzable groups which have a higher reactivity to water than the silane-terminated polymers are added to these one-component materials. The amount of added water scavengers depends on the water content of the components of the formulation and on the desired shelf-lives and processing times. In general, these are organofunctional silanes, the organic radical often being critical for the reactivity. Examples of such silanes are vinyltrimethoxysilane and alkylaminopropyltrimethoxysilanes, but also, for example, silanes which bind water with the formation of ammonia, such as hexamethyldisilazane.

In general, substituted propyltrimethoxysilanes are used for the termination since they are as a rule economically available and have very good reactivity in the materials. However, owing to the high reactivity, the polymers are also problematic with regard to processing, for example in the incorporation of water-containing fillers or additives which increase the reactivity further; moreover, the shelf-lives are often insufficient.

For example, the addition of relatively large amounts of aminosilanes as adhesion promoters can greatly reduce the shelf-life. The materials generally have to be stabilized by means of further added components, such as, for example, the phosphoric esters described in DE-A-19923300, in order to moderate the catalyst activity. Furthermore, the addition of standard water scavengers, such as vinyltrimethoxysilane, is suitable only to a limited extent for stabilizing the materials.

Analogously to the organic polymers already described above, polydiorganosiloxanes having high reactivities are also known. U.S. Pat. No. 5,254,657 describes moisture-curing silicone-based materials in which the crosslinkable silane units are prepared analogously to the organic polymers via the reaction of an aminosilicone with an isocyanatoalkylalkoxysilane. These too have a problematic shelf-life owing to the high reactivity of the terminal silane groups.

SUMMARY OF THE INVENTION

It has now been surprisingly discovered that alkoxy-crosslinking one-component moisture-curing materials with improved shelf life characteristics, yet which retain desirable curing characteristics, may be prepared from (alkoxy)(methyl)silyalkyl-terminated polymers and specific silanes, as described hereinafter.

DETAILED DESCRIPTION OF THE INVENTION

The invention relates to alkoxy-crosslinking one-component materials which comprise (A) alkoxysilane-terminated polymer having terminal groups of the general formula (1)

$$-A-Si(R)_a(CH_3)_{3-a} \qquad (1)$$

and (B) silane which is selected from silanes of the general formulae (2) to (4)

$$X-CH_2-Si(R)_a(CH_3)_{3-a} \qquad (2)$$

$$R''N[CH_2-Si(R)_a(CH_3)_{3-a}]_2 \qquad (3)$$

$$N[CH_2-Si(R)_a(CH_3)_{3-a}]_3 \qquad (4)$$

in which

A is a divalent optionally halogen-substituted hydrocarbon radical having 1 to 18 C atoms, R is a methoxy or ethoxy group, X is an R"O— or R"NH— group or halogen, R" is hydrogen, an optionally halogen-substituted cyclic, linear or branched $C_{1-18}$-alkyl or $C_{6-18}$-aryl radical, or an R'—O—CO— or R'—NH—CO— radical, R' is an optionally halogen-substituted $C_{1-8}$-hydrocarbon radical and a is an integer from 1 to 3.

The materials based on alkoxyorganosilane-terminated polymers (A) have an excellent shelf-life and excellent curing characteristics. It has in fact been found that the addition of silanes of the general formulae (2) to (4) to polymers (A) is suitable for preparing such materials having an improved shelf-life without having an adverse effect on the kinetics of curing and the complete curing of materials. With regard to the processing, the materials are processible for a sufficiently long time without gelling, owing to the very high reactivity of the silanes of the general formulae (2) to (4), in contrast to the compositions to date. The processing time can be adjusted by the added amount of silane. However, because the silanes of the general formulae (2) to (4) have a sufficiently high reactivity, the skin formation and complete curing times are only slightly dependent on the amount of silane. Thus, it is possible to prepare materials which are very well stabilized to relatively large amounts of water, which emerge, for example, from the fillers during storage, without adversely affecting the curing characteristics.

The preparation of various silane-terminated polymers (A) is described, for example, in U.S. Pat. No. 3,971,751, EP-A-70475, DE-A-19849817, U.S. Pat. No. 6,124,387 or U.S. Pat. No. 5,990,257. Various products are commercially available, such as MS-Polymer S203H and S303H (from Kaneka Corp.), Desmoseal® LS 2237 (Bayer AG), Polymer ST50 (Hanse-Chemie GmbH), Excestar® S2410 and S2420 (Asahi Glass), Permapol® MS (Courtaulds Coatings Inc.) or WSP 725-80 (Witton Chemical Co.). In addition, further silane-terminated polymers (A) having an organic polymer skeleton can also be used.

The polymers (A) preferably contain a skeleton comprising polyurethane, polyether, polyester, polyacrylate, polyvinyl ester, ethylene/olefin copolymer, styrene/butadiene copolymer or polyolefin. Polyethers, polyesters and polyurethanes having molar masses Mn of 5 000–50 000, in particular 10 000–25 000, are particularly preferred. The viscosities of the polymers (A) are preferably not more than 200 Pa·s, in particular not more than 100 Pa·s.

In the above general formulae (1) to (4):

R" is preferably hydrogen, a cyclic or linear $C_{1-6}$-alkyl or $C_{6-10}$-aryl radical, especially butyl, cyclohexyl or phenyl, R' is preferably a $C_{1-4}$-alkyl or phenyl radical; especially methyl or ethyl, A is preferably a branched or linear $C_{1-6}$-alkyl radical, in particular a methylene or a trimethylene group, a preferably has the values 2 or 3.

A multiplicity of possibilities is known for the preparation of silane-terminated polymers (A), in particular:

Copolymerization of unsaturated monomers with those which have, for example, alkoxysilyl groups, such as vinyltrimethoxysilane.

Grafting of unsaturated monomers, such as vinyltrimethoxysilane, onto thermoplastics, such as polyethylene.

The addition of H-silanes, such as methyldimethoxysilane, at the carbon double bonds under noble metal catalysis.

Reaction of organosilanes with the prepolymer. Here, a functional group of the prepolymer is reacted with a functional group of the silane.

The frequently adopted and simplest route for the last-mentioned case is a reaction of NCO groups of an isocyanate prepolymer with an aminosilane of the general formula (5):

$$R^1\text{—NH-A-Si}(R)_a(CH_3)_{3-a} \quad (5)$$

Accordingly, OH groups of an isocyanate prepolymer, but also of a very wide range of other parent polymer building blocks, such as, for example, pure polyethers, can furthermore be reacted with an isocyanatosilane of the general formula (6):

$$\text{OCN-A-Si}(R)_a(CH_3)_{3-a} \quad (6)$$

In the general formulae (5) and (6), $R^1$ is hydrogen or an optionally halogen-substituted alkyl radical having 1 to 18, in particular 1 to 6, C atoms, or an aryl radical having 6 to 18, in particular 6 to 10, C atoms, A, R and a have the above meanings.

Preferably, A is trimethylene, R is methoxy, $R^1$ is phenyl or a linear alkyl radical, such as ethyl or butyl, and a has the value 3.

In a preferred embodiment, the alkoxysilane-terminated polymer (A) has terminal groups of the general formula (7)

$$-NR^1-CH_2-Si(R)_a(CH_3)_{3-a} \quad (7).$$

This can be prepared analogously to the process described above by reacting NCO groups of an isocyanate prepolymer with an aminosilane of the general formula (8):

$$R^1NH-CH_2-Si(R)_a(CH_3)_{3-a} \quad (8)$$

Accordingly, OH groups of an isocyanate prepolymer, but also of a very wide range of other parent polymer building blocks, such as, for example, pure polyethers, can furthermore be reacted with an isocyanatosilane of the general formula (9).

$$\text{OCN}-CH_2-Si(R)_a(CH_3)_{3-a} \quad (9)$$

In the general formulae (7) and (8) and (9), $R^1$, R and a have the above meanings. Preferably, $R^1$ is phenyl or a linear alkyl radical, such as ethyl or butyl, and a has the values 2 or 3.

In the case of silane-terminated polymers (A) having terminal groups of the general formula (7), it has been found that, owing to their very high reactivity, they can be compounded only with very great difficulty. The water content of conventional fillers and additives is often sufficient to lead to complete gelling of the material during the compounding or to substantial stiffening, which generally results in materials which can be scarcely processed. Furthermore, these materials are problematic with regard to their shelf-life and cannot be stored for a long time. During the processing of these RTV-1 mixtures, the materials attract moisture so rapidly that uniform processing is impossible. The attempt to stabilize these materials with the standard water scavengers described above was unsuccessful.

In contrast to the water scavengers to date, silane-terminated polymers (A) according to the general formula (7) can be stabilized for a sufficiently long time without gelling, owing to the very high reactivity of the silanes of the general formulae (2), (3) and (4). Here too, the processing time can be adjusted by the added amount of silane. However, the processing times and the tack-free and complete curing times are substantially shorter. Thus, fast RTV-1 materials having a long shelf-life and comprising silane-terminated polymers (A) according to the general formula (7) can now also be prepared.

Polymers having a skeleton comprising polydiorganosiloxane and terminal groups of the general formula (1) can also be used as polymers (A). Silanes of the general formula (6) are preferably subjected to an addition reaction with silicone oils having terminal hydroxyalkyl or aminoalkyl groups.

Conventional silicone polymers, prepared by blocking of Si—OH-terminated silicone oils with alkoxy-functional silanes, such as vinyltrimethoxysilane or methyltrimethoxysilane, can also be used as a further embodiment instead of the polymers (A).

Organofunctional silanes of the general formulae (2), (3) and (4) having methylene spacers can be used as component (B). Examples of such silanes are aminomethyltrimethoxysilane, aminomethylmethyldimethoxysilane, bis(trimethoxysilylmethyl)amine, aminomethyltriethoxysilane, aminomethylmethyldiethoxysilane, bis(triethoxysilylmethyl)amine, phenylaminomethyltrimethoxysilane, phenylaminomethylmethyldimethoxysilane, butylaminomethyltrimethoxysilane, butylaminomethyl-methyldimethoxysilane, cyclohexylaminomethyltrimethoxysilane, cyclohexylaminomethyl-methyldimethoxysilane, methoxymethyltrimethoxysilane, methoxymethyl-methyldimethoxysilane, ethoxymethyltriethoxysilane, ethoxymethylmethyldiethoxysilane, methylcarbamatomethyltrimethoxysilane, methylcarbamatomethyl-methyldimethoxysilane, ethylcarbamatomethyltriethoxysilane, ethylcarbamatomethyl-methyldiethoxysilane, chloromethyltrimethoxysilane and chloromethylmethyldimethoxysilane.

Aminomethyltrimethoxysilane and aminomethylmethyldimethoxysilane are preferred, and phenylaminomethyltrimethoxysilane, phenylaminomethylmethyldimethoxysilane, methoxymethyltrimethoxysilane and methoxymethyl-methyldimethoxysilane, methylcarbamatomethyltrimethoxysilane, methylcarbamatomethylmethyldimethoxysilane, ethylcarbamatomethyltriethoxysilane, ethylcarbamatomethyl-methyldiethoxysilane, which have no additional accelerating effect on the reactivity owing to their lower basicity, are particularly preferred.

The materials preferably contain from 0.1 to 20 parts by weight, particularly preferably from 0.5 to 10 parts by weight, in particular from 2 to 6 parts by weight, of silanes (B) per 100 parts by weight of polymer (A).

The materials may contain, as component (C), a catalyst for curing. Preferably, all organometallic catalysts which are known to promote silane condensation can be used as component (C). These are in particular tin compounds and titanium compounds. Preferred tin compounds are dibutyltin dilaurate, dibutyltin diacetate and dibutyltin bisacetylacetonate. Preferred titanium compounds are alkyl titantates, such as tetraisoproyl titanate and tetrabutyl titanate. Furthermore, basic amines can be used as cocatalysts but, where suitable, also as the catalyst itself. For example, compounds such as 1,8-diazabicyclo-[5.4.0]undec-7-ene or 4-dimethylaminopyridine are preferred. Furthermore, organic nitrogen compounds which carry at least one silyl group may also be used. Suitable bases having a silyl group are, for example, silanes containing amino groups, such as aminopropyltrimethoxysilane, aminopropyltriethoxysilane, aminomethyltrimethoxysilane, aminomethyltriethoxysilane, aminoethylaminopropyltrimethoxysilane, butylaminopropyltrimethoxysilane, butylaminomethyltrimethoxysilane, cyclohexylaminomethyltrimethoxysilane and cyclohexylaminopropyltrimethoxysilane.

The materials may furthermore contain, as component (D), assistants known per se, such as adhesion promoters, plasticizers, fillers, thixotropic agents, light stabilizers, fungicides and pigments, which are known for use in alkoxycrosslinking one-component materials.

All above symbols of the above formulae have their meanings in each case independently of one another. In all formulae, the silicon atom is tetravalent.

The following examples serve for illustrating the invention without restricting it. Unless stated otherwise, all stated amounts and percentages are based on weight, all pressures are 0.10 MPa (abs.) and all temperatures are 20° C.

EXAMPLES

Preparation of Isocyanatomethyltrimethoxysilane:

Starting from chloromethyltrimethoxysilane, methylcarbamatomethyltrimethoxysilane is synthesized according to known processes (U.S. Pat. No. 3,494,951).

This is pumped in an argon gas stream into a quartz pyrolysis tube filled with quartz wool. The temperature in the pyrolysis tube is between 420 and 470 C. At the end of the heated zone, the crude product is condensed with the aid of a condenser and collected. The colorless liquid is purified by distillation under reduced pressure. The desired product passes over at the top at about 88–90 C (82 mbar) in more than 99% purity, while the unreacted carbamate can be reisolated in the bottom. This is recycled directly to the pyrolysis.

Starting from 56.9 g (273 mmol) of methylcarbamatomethyltrimethoxysilane, 33.9 g (191 mmol) of the desired product isocyanatomethyl-trimethoxysilane are contained in this manner in a purity>97%. This corresponds to a yield of 70% of theory.

Preparation of N-phenylaminomethyltrimethoxysilane:

537 g (5.77 mol) of aniline are initially completely introduced into a laboratory reactor and then blanketed with nitrogen. Heating to a temperature of 115° C. is effected and 328 g (1.92 mol) of chloromethyltrimethoxysilane are added dropwise over 1.5 h and stirring is effected for a further 30 minutes at 125–130° C. After an addition of about 150 g of the silane, anilinium hydrochloride is increasingly precipitated as the salt, but the suspension remains readily stirrable until the end of the metering. Aniline used in excess (about 180 g) is removed under a good vacuum (62° C. at 7 mbar). Thereafter, 350 ml of toluene are added at about 50° C. and the suspension is stirred for 30 min at 10° C. in order to crystallize aniline hydrochloride completely. This is then filtered off. The solvent toluene is removed under a partial vacuum at 60–70° C. The residue is purified by distillation (89–91° C. at 0.16 mbar).

A yield of 331 g, i.e. 75.9% of theory, is achieved at a product purity of about 96.5%. The product contains about 3.5% of N,N-bis[trimethoxysilylmethyl]phenylamine as an impurity.

Preparation of Methoxymethyltrimethoxysilane:

340 g (6.3 mol) of sodium methylate (95% strength) are dissolved in portions in 2.5 l of methanol in a laboratory reactor blanketed with nitrogen. During this procedure, the solution heats up to 65° C. Thereafter, 995 g (5.8 mol) of chloromethyltrimethoxysilane are added dropwise over 1.5 h and stirring is effected for a further 30 minutes at the boil. On addition of the silane, sodium chloride is precipitated spontaneously as the salt, but the suspension remains readily stirrable until the end of the metering. The precipitated sodium chloride is filtered off with suction and the methanol is removed under a partial vacuum at 40–50° C. The residue is purified by distillation (97–98° C. at 172 mbar).

A yield of 678.0 g, i.e. 70.3% of theory, is achieved at a product purity of about 99.5%.

Example 1 (Comparative Example)

400 g of a polypropylene glycol having an average molecular weight of 8,000 g/mol are polymerized with 23.0 g of isophorone diisocyanate at 100° C. in the course of 60 min. The polyurethane prepolymer obtained is then cooled to 60° C. and mixed with 12.8 g of phenylaminopropyltrimethoxysilane (obtainable from CK-Witco under Silquest® Y-9669) and stirred for 60 min until an isocyanate band is no longer visible in the IR spectrum. The silane-terminated polymer thus obtained is mixed, at about 25° C., with 155 g of diisoundecyl phthalate, 21.0 g of 3-(2-aminoethyl)aminopropyl-trimethoxysilane, 21.0 g of vinyltrimethoxysilane and 435 g of precipitated and dried chalk (water content <300 ppm) and processed in the course of 0.5 h in a laboratory planetary mixer to give a firm paste. Finally, 2.0 g of dibutyltin dilaurate are mixed in as a catalyst in the course of 10 min. A part of the paste is applied with a layer thickness of 5 mm to a Teflon sheet by means of a doctor blade and crosslinked under the action of atmospheric humidity to give a resilient rubber. The tack-free times and the complete curing of the specimen are determined (23° C./50% relative humidity).

A further part of the paste is introduced into aluminum cartridges and stored for 4 days at 70° C. Thereafter, the consistency is tested and the tack-free times and the complete curing are determined as described above. The characteristics of the product are listed in table 1.

Example 2

A silane-terminated polymer prepared according to example 1 is mixed at about 25° C. with 155 g of diisoundecyl phthalate, 21.0 g of 3-(2-aminoethyl)aminopropyltrimethoxysilane, 21.0 g of methoxymethyltrimethoxysilane and 435 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 3

A silane-terminated polymer prepared according to example 1 is mixed at about 25° C. with 155 g of diisoundecyl phthalate, 21.0 g of 3-(2-aminoethyl)aminopropyltrimethoxysilane, 42.0 g of methoxymethyltrimethoxysilane and 435 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 4

A silane-terminated polymer prepared according to example 1 is mixed at about 25° C. with 155 g of diisoundecyl phthalate, 21.0 g of 3-(2-aminoethyl)aminopropyltrimethoxysilane, 42.0 g of phenylaminomethyltrimethoxysilane and 435 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 5 (Comparative Example)

300 g of Desmoseal® LS 2237 (silane-terminated polyurethane, obtainable from Bayer AG) are mixed at about 25° C. with 108 g of diisoundecyl phthalate, 16.7 g of 3-(2-aminoethyl)aminopropyltrimethoxysilane, 16.7 g of vinyltrimethoxysilane and 328 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 6

300 g of Desmoseal® LS 2237 are mixed at about 25° C. with 108 g of diisoundecyl phthalate, 16.7 g of 3-(2-aminoethyl)aminopropyltrimethoxysilane, 16.7 g of methoxymethyltrimethoxysilane and 328 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 7

300 g of Desmoseal® LS 2237 are mixed at about 25° C. with 108 g of diisoundecyl phthalate, 16.7 g of 3-(2-aminoethyl)aminopropyltrimethoxysilane, 33.4 g of methoxymethyltrimethoxysilane and 328 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 8

300 g of Desmoseal® LS 2237 are mixed at about 25° C. with 108.0 g of diisoundecyl phthalate, 16.7 g of 3-(2-aminoethyl)aminopropyltrimethoxysilane, 16.7 g of phenylaminomethyltrimethoxysilane and 328 g of precipitated and dried chalk (water content<300 ppm) and processed in the course of 0.5 h in a laboratory planetary mixer to give a firm paste. Finally, 2.0 g of dibutyltin dilaurate are mixed in as a catalyst in the course of 10 min.

The tack-free times, the complete curing and the shelf-life are determined as described above. The characteristics of the product are listed in table 1.

Example 9 (Comparative Example)

500 g of α,ω-aminopropylpolydimethylsiloxane having an average molecular weight of 15,000 g/mol are heated to 80° C. in a heatable laboratory planetary mixer provided with a vacuum pump and are heated to completion in the course of 0.5 h in vacuo. After cooling to 30–35° C., 16.4 g of isocyanatopropyltrimethoxysilane (obtainable from CK-Witco under Silquest® Y-5187) are added and stirring is effected for a further 30 min. The silane-terminated polymer thus obtained is mixed at about 25° C. with 230 g of a trimethylsilyl-terminated polydimethylsiloxane having a viscosity of 100 Pa·s, 16.7 g of 3-(2-aminoethyl)aminopropyltrimethoxysilane, 16.7 g of vinyltrimethoxysilane and 85 g of a hydrophilic pyrogenic silica (obtainable from Wacher-Chemie-GmbH under HDK®-V15) and processed in the course of 0.5 h to give a firm paste. Finally, 0.75 g of dibutyltin dilaurate is mixed in as a catalyst in the course of 10 min.

The tack-free times, the complete curing and the shelf-life are determined as described above. The characteristics of the product are listed in table 1.

Example 10

A silane-terminated polymer prepared according to example 8 is mixed at about 25° C. with 230 g of a trimethylsilyl-terminated polydimethylsiloxane having a viscosity of 100 Pa·s, 16.7 g of 3-(2-aminoethyl)aminopropyltrimethoxysilane, 16.7 g of methoxymethyltrimethoxysilane and 85 g of a hydrophilic pyrogenic silica and processed in the course of 0.5 h to give a firm paste. Finally, 0.75 g of dibutyltin dilaurate is mixed in as a catalyst in the course of 10 min.

The tack-free times, the complete curing and the shelf-life are determined as described above. The characteristics of the product are listed in table 1.

Example 11

A silane-terminated polymer prepared according to example 8 is mixed at about 25° C. with 230 g of a trimethylsilyl-terminated polydimethylsiloxane having a viscosity of 100 Pa·s, 16.7 g of 3-(2-aminoethyl)aminopropyltrimethoxysilane, 33.4 g of methoxymethyltrimethoxysilane and 85 g of a hydrophilic pyrogenic silica and processed in the course of 0.5 h to give a firm paste. Finally, 0.75 g of dibutyltin dilaurate is mixed in as a catalyst in the course of 10 min.

The tack-free times, the complete curing and the shelf-life are determined as described above. The characteristics of the product are listed in table 1.

Example 12

A silane-terminated polymer prepared according to example 8 is mixed at about 25° C. with 230 g of a trimethylsilyl-terminated polydimethylsiloxane having a viscosity of 100 Pa·s, 16.7 g of 3-(2-aminoethyl)aminopropyltrimethoxysilane, 16.7 g of phenylaminomethyltrimethoxysilane and 85 g of a hydrophilic pyrogenic silica and processed in the course of 0.5 h to give a firm paste. Finally, 0.75 g of dibutyltin dilaurate is mixed in as a catalyst in the course of 10 min.

The tack-free times, the complete curing and the shelf-life are determined as described above. The characteristics of the product are listed in table 1.

Example 13 (Comparative Example)

400 g of a polypropylene glycol having an average molecular weight of 8 000 g/mol are polymerized with 23.0 g of isophorone diisocyanate at 100° C. in the course of 60 min. The polyurethane prepolymer obtained is then cooled to 60° C. and mixed with 10.5 g of phenylaminomethyltrimethoxysilane and stirred for 60 min until an isocyanate band is no longer visible in the IR spectrum. The silane-terminated polymer thus obtained is mixed at about 25° C. with 155 g of diisoundecyl phthalate, 21.0 g of 3-(2-aminoethyl)aminopropyltrimethoxysilane, 21.0 g of vinyltrimethoxysilane and 435 g of precipitated and dried chalk (water content<300 ppm) and processed in a laboratory planetary mixer to give a firm paste. The product gels as early as when the fillers are incorporated.

Example 14 (Comparative Example)

A silane-terminated polymer prepared according to example 13 is compounded as described there, using 63.0 g of vinyltrimethoxysilane. The product could still be processed in the laboratory planetary mixer to give a firm paste but has spontaneously cured completely during the production of the test specimens.

Example 15 (Comparative Example)

400 g of a polypropylene glycol having an average molecular weight of 8,000 g/mol are polymerized with 12.5 g of isophorone diisocyanate at 100° C. in the course of 60 min. The polyurethane prepolymer obtained is then cooled to 60° C. and mixed with 19.7 g of isocyanatomethyltrimethoxysilane and stirred for 60 min until an isocyanate band is no longer visible in the IR spectrum. The silane-terminated polymer thus obtained is mixed at about 25° C. with 155 g of diisoundecyl phthalate, 21.0 g of 3-(2-aminoethyl)aminopropyl-trimethoxysilane, 21.0 g of vinyltrimethoxysilane and 435 g of precipitated and dried chalk (water content<300 ppm) and processed in a laboratory planetary mixer to give a firm paste. The product gels as early as when the fillers are incorporated.

Example 16

A silane-terminated polymer prepared according to example 13 is mixed at about 25° C. with 155 g of diisoundecyl phthalate, 21.0 g of 3-(2-aminoethyl)aminopropyltrimethoxysilane, 21.0 g of methoxymethyltrimethoxysilane and 435 g of precipitated and dried chalk (water content<300 ppm) and processed in a laboratory planetary mixer to give a firm paste. The tack-free times, the complete curing and the shelf-life are determined as described above. The characteristics of the product are listed in table 1.

Example 17

A silane-terminated polymer prepared according to example 13 is mixed at about 25° C. with 155 g of diisoundecyl phthalate, 21.0 g of 3-(2-aminoethyl)aminopropyltrimethoxysilane, 42.0 g of methoxymethyltrimethoxysilane and 435 g of precipitated and dried chalk (water content<300 ppm) and processed in a laboratory planetary mixer to give a firm paste. The tack-free times, the complete curing and the shelf-life are determined as described above. The characteristics of the product are listed in table 1.

Example 18

A silane-terminated polymer prepared according to example 13 is mixed at about 25° C. with 155 g of diisoundecyl phthalate, 21.0 g of 3-(2-aminoethyl)aminopropyltrimethoxysilane, 21.0 g of phenylaminomethyltrimethoxysilane and 435 g of precipitated and dried chalk (water content<300 ppm) and processed in a laboratory planetary mixer to give a firm paste. The tack-free times, the complete curing and the shelf-life are determined as described above. The characteristics of the product are listed in table 1.

Example 19

A silane-terminated polymer prepared according to example 15 is mixed at about 25° C. with 155 g of diisoundecyl phthalate, 21.0 g of 3-(2-aminoethyl)aminopropyltrimethoxysilane, 42.0 g of methoxymethyltrimethoxysilane and 435 g of precipitated and dried chalk (water content<300 ppm) and processed in a laboratory planetary mixer to give a firm paste. The tack-free times, the complete curing and the shelf-life are determined as described above. The characteristics of the product are listed in table 1.

TABLE 1

Curing characteristics and shelf-life of the moisture-curing materials

| Example | Tack-free [min] | Complete curing [mm/d] | Tack-free 4d/60° C. [min] | Complete curing 4d/60° C. [mm/d] | Shelf-life (remark) |
|---|---|---|---|---|---|
| Example 1 (comparison) | 60 | 2–3 | 35 | 2 | Paste substantially more viscous |
| Example 2 | 40 | 3 | 40 | 2–3 | Paste slightly more viscous |
| Example 3 | 45 | 3 | 40 | 3 | Paste unchanged |
| Example 4 | 50 | 2–3 | 45 | 2–3 | Paste unchanged |
| Example 5 (comparison) | 70 | 3–4 | 45 | 2–3 | Paste substantially more viscous |
| Example 6 | 60 | 3–4 | 55 | 3–4 | Paste unchanged |
| Example 7 | 65 | 3–4 | 65 | 3–4 | Paste unchanged |
| Example 8 | 65 | 3–4 | 55 | 4 | Paste slightly more viscous |
| Example 9 (comparison) | 15 | 5–6 | 5 | 10–12 | Paste substantially more viscous |
| Example 10 | 15 | 6–7 | 10 | 6–7 | Paste slightly more viscous |
| Example 11 | 15 | 6–7 | 15 | 6–7 | Paste unchanged |
| Example 12 | 15 | 6–7 | 15 | 6–7 | Paste unchanged |
| Example 16 | 4 | >15 | 3 | >15 | Paste slightly more viscous |
| Example 17 | 7 | >15 | 6 | >15 | Paste unchanged |
| Example 18 | 4 | >15 | 3 | >15 | Paste slightly more viscous |
| Example 19 | 6 | >15 | 5 | >15 | Paste unchanged |

Example 20

500 g of an α,ω-OH-terminated polypropylene glycol having an average molecular weight of 12,000 g/mol are reacted with 17.7 g of isocyanatomethyltrimethoxysilane at 90° C. in the course of 60 min with addition of 130 mg of dibutyltin dilaurate. The silane-terminated polyether thus obtained is mixed with a further 10.5 g of a silane (cf. table 2) and stored in air. The viscosity of the polymer is determined as a function of time.

Depending on added silane, an increase in the viscosity in air at different rates as a result of condensation of the polymer by means of atmospheric humidity is observed, the silanes used according to the invention leading to substantially higher stabilization of the polymer.

TABLE 2

Viscosity increase of a silane-terminated polyether under the action of atmospheric humidity depending on the silane used (2.0% by weight each)
Viscosity [Pa · s]

| | Time (days) | | | |
|---|---|---|---|---|
| | 0 | 1 | 2 | 3 |
| Methylcarbamatomethyl-trimethoxysilane | 12 | 11 | 14 | 24 |
| Methoxymethyltri-methoxysilane | 12 | 13 | 19 | 30 |
| Vinyltrimethoxysilane (not according to the invention) | 12 | 15 | 30 | 45 (tack-free) |
| Methyltrimethoxysilane (not according to the invention) | 13 | 19 | 47 (tack-free) | — |
| No addition | 13 | 26 | 53 (tack-free) | — |

The invention claimed is:

1. An alkoxy-crosslinking one-component composition, comprising:
   (A) at least one alkoxysilane-terminated polymer having terminal groups of the general formula (1)

and
   (B) at least one silane selected from the group consisting of silanes of the formulae (2) to (4)

wherein
   A is a divalent optionally halogen-substituted $C_{1-18}$ hydrocarbon radical,
   R is independently methoxy or ethoxy,
   R" is hydrogen, an optionally halogen-substituted cyclic, linear or branched $C_{1-18}$-alkyl or $C_{6-18}$-aryl radical, or an R'—O—CO— or R'—NH—CO— radical,
   R' is an optionally halogen-substituted $C_{1-8}$-hydrocarbon radical, and
   a is an integer from 1 to 3, and
   wherein X is R"O—.

2. The composition of claim 1, wherein an alkoxysilane-terminated polymer (A) has terminal groups of the general formula (7)

wherein
   $R^1$ is hydrogen or an optionally halogen-substituted $C_{1-18}$ alkyl radical or a $C_{6-18}$ aryl radical.

3. The composition of claim 2, comprising from 0.1 to 20 parts by weight of silane(s) (B) per 100 parts by weight of polymer(s) (A).

4. The composition of claim 3, further comprising at least one as curing a catalyst component (C) in an amount effective to accelerate the curing of said composition when exposed to water.

5. The composition of claim 2, further comprising at least one as curing a catalyst component (C) in an amount effective to accelerate the curing of said composition when exposed to water.

6. The composition of claim 2, wherein at least one polymer (A) is a polymer selected from the group consisting of polyurethane, polyether, polyester, polyacrylate, polyvinyl ester, ethylene/olefin copolymer, styrene/butadiene copolymer and polyolefin, each of said polymers bearing terminal $-A-Si(R)_a(CH_3)_{3-a}$ groups.

7. The composition of claim 2, wherein at least one polymer is a polydiorganosiloxane bearing terminal $-A-Si(R)_a(CH_3)_{3-a}$ groups.

8. The composition of claim 1, comprising from 0.1 to 20 parts by weight of silane(s) (B) per 100 parts by weight of polymer(s) (A).

9. The composition of claim 8, further comprising at least one as curing a catalyst component (C) in an amount effective to accelerate the curing of said composition when exposed to water.

10. The composition of claim 8, wherein at least one polymer (A) is a polymer selected from the group consisting of polyurethane, polyether, polyester, polyacrylate, polyvinyl ester, ethylene/olefin copolymer, styrene/butadiene copolymer and polyolefin, each of said polymers bearing terminal $-A-Si(R)_a(CH_3)_{3-a}$ groups.

11. The composition of claim 8, wherein at least one polymer is a polydiorganosiloxane bearing terminal $-A-Si(R)_a(CH_3)_{3-a}$ groups.

12. The composition of claim 1, further comprising at least one as curing a catalyst component (C) in an amount effective to accelerate the curing of said composition when exposed to water.

13. The composition of claim 12, wherein at least one polymer (A) is a polymer selected from the group consisting of polyurethane, polyether, polyester, polyacrylate, polyvinyl ester, ethylene/olefin copolymer, styrene/butadiene copolymer and polyolefin, each of said polymers bearing terminal $-A-Si(R)_a(CH_3)_{3-a}$ groups.

14. The composition of claim 12, wherein at least one polymer is a polydiorganosiloxane bearing terminal $-A-Si(R)_a(CH_3)_{3-a}$ groups.

15. The composition of claim 1, wherein at least one polymer (A) is a polymer selected from the group consisting of polyurethane, polyether, polyester, polyacrylate, polyvinyl ester, ethylene/olefin copolymer, styrene/butadiene copolymer and polyolefin, each of said polymers bearing terminal $-A-Si(R)_a(CH_3)_{3-a}$ groups.

16. The composition of claim 1, wherein at least one polymer is a polydiorganosiloxane bearing terminal $-A-Si(R)_a(CH_3)_{3-a}$ groups.

* * * * *